United States Patent
Takahashi et al.

(10) Patent No.: US 11,807,158 B2
(45) Date of Patent: Nov. 7, 2023

(54) VEHICLE LIGHTING DEVICE

(71) Applicant: KOITO MANUFACTURING CO., LTD., Tokyo (JP)

(72) Inventors: Yuki Takahashi, Shizuoka (JP); Yusuke Nakada, Shizuoka (JP); Tsuneto Tamura, Shizuoka (JP); Jumpei Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/779,345

(22) PCT Filed: Oct. 28, 2020

(86) PCT No.: PCT/JP2020/040504
§ 371 (c)(1),
(2) Date: May 24, 2022

(87) PCT Pub. No.: WO2021/106483
PCT Pub. Date: Jun. 3, 2021

(65) Prior Publication Data
US 2022/0402429 A1   Dec. 22, 2022

(30) Foreign Application Priority Data
Nov. 25, 2019   (JP) .................................. 2019-212307

(51) Int. Cl.
*B60Q 1/24* (2006.01)
*B60Q 3/51* (2017.01)
(Continued)

(52) U.S. Cl.
CPC ............ *B60Q 1/247* (2022.05); *B60Q 1/549* (2022.05); *B60Q 3/51* (2017.02); *B60Q 3/60* (2017.02);
(Continued)

(58) Field of Classification Search
CPC ... B60Q 3/51; B60Q 3/60; B60Q 3/74; B60Q 3/80; B60Q 1/549; B60Q 2400/40; B60Q 2400/50
See application file for complete search history.

(56) References Cited

U.S. PATENT DOCUMENTS

| 2018/0281674 A1 | 10/2018 | Iseki et al. |
| 2020/0346602 A1 | 11/2020 | Yokoi |
| 2020/0353817 A1 | 11/2020 | Nakada et al. |

FOREIGN PATENT DOCUMENTS

| JP | 2005-280657 A | 10/2005 |
| JP | 2012-101635 A | 5/2012 |

(Continued)

OTHER PUBLICATIONS

International Search Report (PCT/ISA/210) dated Jan. 12, 2021, issued by the International Searching Authority in counterpart International Application No. PCT/JP2020/040504.
(Continued)

*Primary Examiner* — Thomas M Sember
(74) *Attorney, Agent, or Firm* — Sughrue Mion, PLLC (57) ABSTRACT

A vehicle lighting device includes: a first optical system including a light source and a first lens; a second optical system including a light source and a second lens; and a housing configured to house the first optical system and the second optical system. The first optical system is configured to illuminate an interior of a vehicle. The second optical system is configured to display predetermined information to the outside of the vehicle.

10 Claims, 8 Drawing Sheets

(51) Int. Cl.
  *B60Q 3/80*  (2017.01)
  *B60Q 3/60*  (2017.01)
  *B60Q 3/74*  (2017.01)
  *B60Q 1/50*  (2006.01)

(52) U.S. Cl.
  CPC ................ *B60Q 3/74* (2017.02); *B60Q 3/80* (2017.02); *B60Q 2400/40* (2013.01); *B60Q 2400/50* (2013.01)

(56) References Cited

FOREIGN PATENT DOCUMENTS

| | | |
|---|---|---|
| JP | 2018-122769 A | 8/2018 |
| JP | 2018-171941 A | 11/2018 |
| JP | 2019-85076 A | 6/2019 |
| JP | 2019-94021 A | 6/2019 |
| JP | 2019-123421 A | 7/2019 |

OTHER PUBLICATIONS

Written Opinion (PCT/ISA/237) dated Jan. 12, 2021, issued by the International Searching Authority in counterpart International Application No. PCT/JP2020/040504.

VEHICLE LIGHTING DEVICE

CROSS-REFERENCE TO RELATED APPLICATIONS

This application is a National Phase Entry of PCT International Application No. PCT/JP2020/040504, filed on Oct. 28, 2020, which claims priority to Japanese Patent Application No. 2019-212307, filed on Nov. 25, 2019, the contents of all of which are incorporated herein by reference in their entirety.

TECHNICAL FIELD

The present disclosure relates to a vehicle lighting device.

BACKGROUND

There is a drawing device including a lamp casing containing a plurality of lamp units and a bracket for attaching the lamp casing to a vehicle such as a forklift (see Patent Literature 1). The drawing device is configured to draw a colored image signaling approach of the vehicle on a road surface outside the vehicle.

CITATION LIST

Patent Literature

Patent Literature 1: JP2019-85076A

SUMMARY OF INVENTION

Technical Problem

Thus far, a vehicle lighting device for emitting light to an interior of a vehicle and another vehicle lighting device for emitting light to the outside of the vehicle have been required to emit light, for example, for illumination of the interior of the vehicle and for road-surface drawing outside the vehicle. In this case, the cost can be high since two vehicle lighting devices are required.

An object of the present disclosure is to provide a vehicle lighting device that can contribute to cost reduction.

Solution to Problem

In order to achieve the above object, a vehicle lighting device according to an aspect of the present disclosure includes:

a first optical system including a light source and a first lens;

a second optical system including a light source and a second lens; and a housing configured to house the first optical system and the second optical system, in which the first optical system is configured to illuminate an interior of a vehicle, and the second optical system is configured to display predetermined information to the outside of the vehicle.

According to the vehicle lighting device having the above configuration, the vehicle lighting device includes: the first optical system, which includes the light source and the first lens and is configured to illuminate the interior of the vehicle; the second optical system, which includes the light source and the second lens and is configured to display the predetermined information to the outside the vehicle; and the housing, which is configured to house the first optical system and the second optical system. Since the first optical system and the second optical system are housed in the housing, the single vehicle lighting device can emit light for the illumination of the interior of the vehicle and for displaying the predetermined information to the outside of the vehicle. That is, a vehicle lighting device for emitting light to the interior of the vehicle and another separate vehicle lighting device for emitting light to the outside of the vehicle are not required.

Thus, the vehicle lighting device according to the above configuration can contribute to the cost reduction.

Advantageous Effects of Invention

According to the present disclosure, it is possible to provide a vehicle lighting device that can contribute to cost reduction.

DESCRIPTION OF EMBODIMENTS

In the following, an example of an embodiment of the present disclosure (hereinafter, referred to as the present embodiment) will be described with reference to the drawings. Description of components having the same reference numbers as those described in description of the present embodiment will be omitted for convenience. Dimensions of components shown in the drawings may be different from actual ones for convenience.

Figure 1:
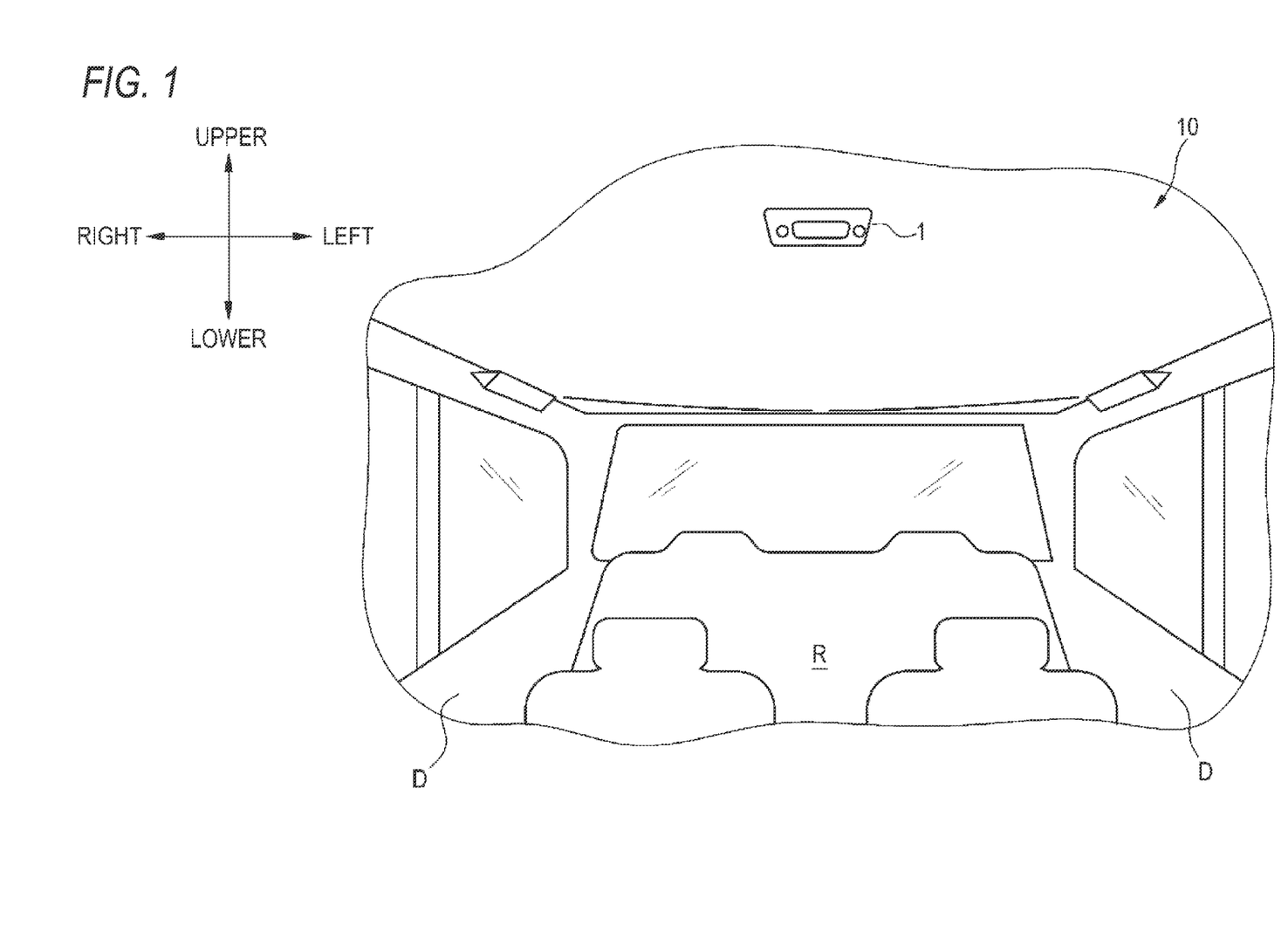
FIG. 1 is a schematic diagram of an interior of a vehicle including a vehicle lighting device according to a first embodiment.

In the description of the present embodiment, a "left-right direction," a "front-rear direction," and an "upper-lower direction" are referred to for convenience, as appropriate. These are relative directions set with respect to a vehicle lighting device 1 mounted on a vehicle 10 as shown in FIG. 1. Accordingly, "left," "right," "front," "rear," "upper," and "lower" in the specification and the drawings are displayed for convenience and are not intended to limit the directions. The "left-right direction" includes a "left direction" and a "right direction." The "front-rear direction" includes a "front direction" and a "rear direction." The "upper-lower direction" includes an "upper direction" and a "lower direction."

First Embodiment

FIG. 1 is a schematic diagram of an interior R of the vehicle 10 including the vehicle lighting device 1 (hereinafter, simply referred to as a "lighting device 1") according to the first embodiment. The vehicle 10 includes doors D on the left and right sides. The doors D are configured to open and close, for example, in the left-right direction or the front-rear direction. The lighting device 1 is on a roof of the interior R of the vehicle 10, for example, above a center of a rear seat. The lighting device 1 may function as, for example, an interior light or a reading light in an automobile or the like.

Figure 2:
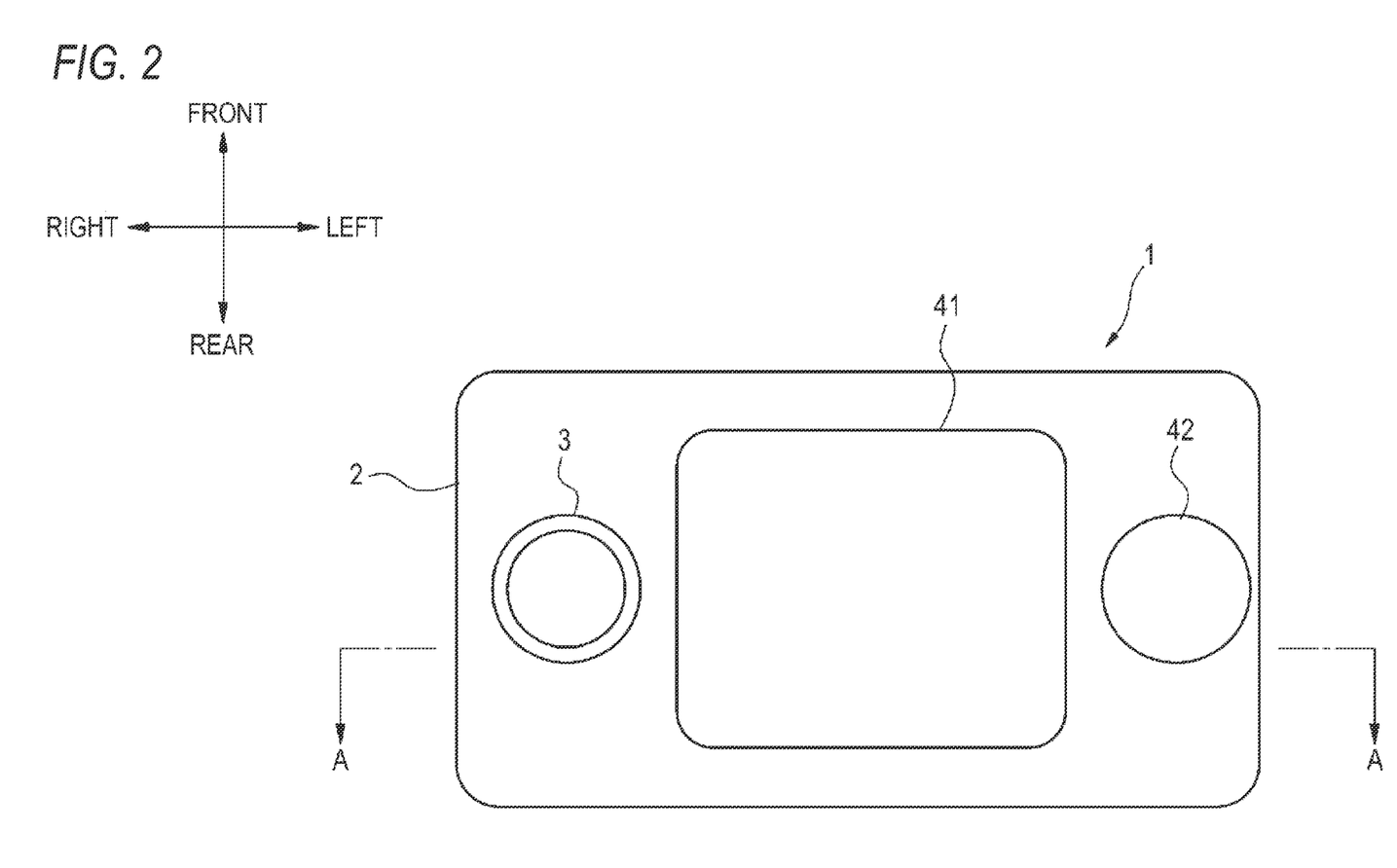
FIG. 2 is a diagram showing an exterior of the vehicle lighting device according to the first embodiment.

Next, the lighting device 1 will be described with reference to FIGS. 2 to 4. FIG. 2 is a diagram showing an exterior of the lighting device 1 as viewed from below. As exemplified in FIG. 2, the lighting device 1 has a substantially rectangular parallelepiped shape and has a substantially rectangular shape in the bottom view. Corners of the lighting device 1 are rounded. The lighting device 1 includes: a housing 2; an object detector 3; a first optical system 41; and a second optical system 42. The first optical system 41 is substantially in the center of the housing 2 as viewed from the bottom of the lighting device 1, the object detector 3 is to the right of the first optical system 41, and the second optical system 42 is to the left of the first optical system 41.

Figure 3:
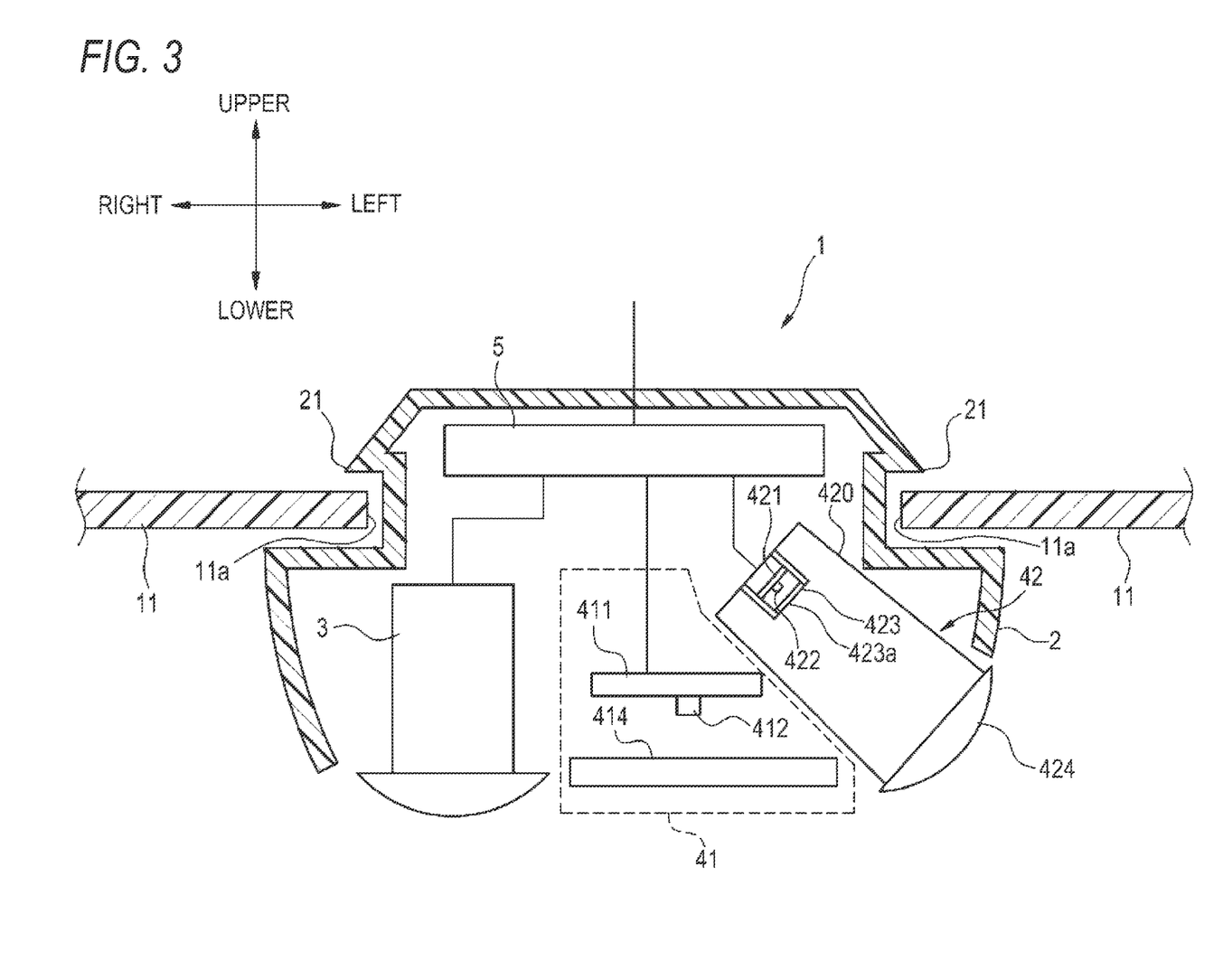
FIG. 3 is a cross sectional view taken along a line A-A in FIG. 2.

FIG. 3 is a cross sectional view taken along a line A-A in FIG. 2 of the lighting device 1. As exemplified in FIG. 3, the lighting device 1 includes: the housing 2; the object detector 3; the first optical system 41; the second optical system 42; and a controller 5. The object detector 3, the first optical system 41, the second optical system 42, and the controller 5 are housed in the housing 2. The housing 2 has a substantially convex shape in a cross-sectional view. The housing 2 includes an engagement portion 21 configured to engage with an opening 11a of a roof plate 11 of the vehicle 10. By the engagement portion 21 engaging with the opening 11a of the roof plate 11, the lighting device 1 is attached to the vehicle 10.

The object detector 3 is configured to detect information (interior environment information) about an interior environment of the vehicle 10 (a shape of the rear seat, an object on the rear seat, or the like).

The first optical system 41 is configured to illuminate the interior of the vehicle 10. The first optical system 41 includes: a first substrate 411; a first light source 412; and a first lens 414. The first substrate 411 has a tabular shape. The first light source 412 is on a lower surface of the first substrate 411.

The first light source 412 is, for example, a light-emitting diode (LED). The first light source 412 is configured to emit light toward the first lens 414.

The first lens 414 is in a lower part of the first optical system 41. The first lens 414 is made of, for example, a transparent material, such as acrylic resin, polycarbonate resin, and glass. In the first lens 414, formed is a step for diffusing the light downward that is emitted from the first light source 412. That is, the first lens 414 is configured such that the light from the first light source 412 is emitted as diffused light to the outside (the interior R of the vehicle 10) of the lighting device 1. Therefore, the first lens 414 does not have a specific focal point.

The second optical system 42 includes: an inner housing 420; a second substrate 421; a second light source 422; a second douser 423; and a second lens 424. The inner housing 420 is configured to house the second substrate 421, the second light source 422, and the second douser 423. The inner housing 420 has an opening facing downward to which the second lens 424 is attached.

The second substrate 421 has a tabular shape. The second light source 422 is on a lower surface of the second substrate 421.

The second light source 422 is, for example, a semiconducting light-emitting device, such as an LED, a laser diode, and an organic/inorganic electro luminescence (EL) device.

The second douser 423 has a tabular shape. The second douser 423 is between the second light source 422 and the second lens 424. The second douser 423 is, for example, a chart configured with a tabular member made of synthetic resin. The second douser 423 has a light-passing portion 423a. The light-passing portion 423a may be formed in a shape representing, for example, predetermined information. The shape representing the predetermined information is, for example, a shape corresponding to a character, a symbol, a figure, or the like that represents a message (for example, "THANK YOU") offering hospitality to a person who gets off the vehicle 10 (getting-off person).

The second lens 424 may be made of a material similar to that of the first lens 414. The second lens 424 is, for example, a convex lens, whose rear focal point is in the vicinity of the second light source 422 or the second douser 423. The light emitted from the second light source 422 passes through the light-passing portion 423a of the second douser 423 and is emitted from the second lens 424 as a light distribution pattern representing the predetermined information.

The controller 5 is in an upper portion in the housing 2. Cables are connected to the controller 5. The cables are connected to the object detector 3, the first optical system, 41, and the second optical system 42. A cable for communicating with a vehicle controller 6 (see FIG. 4) of the vehicle 10 is also connected to the controller 5.

Figure 4:
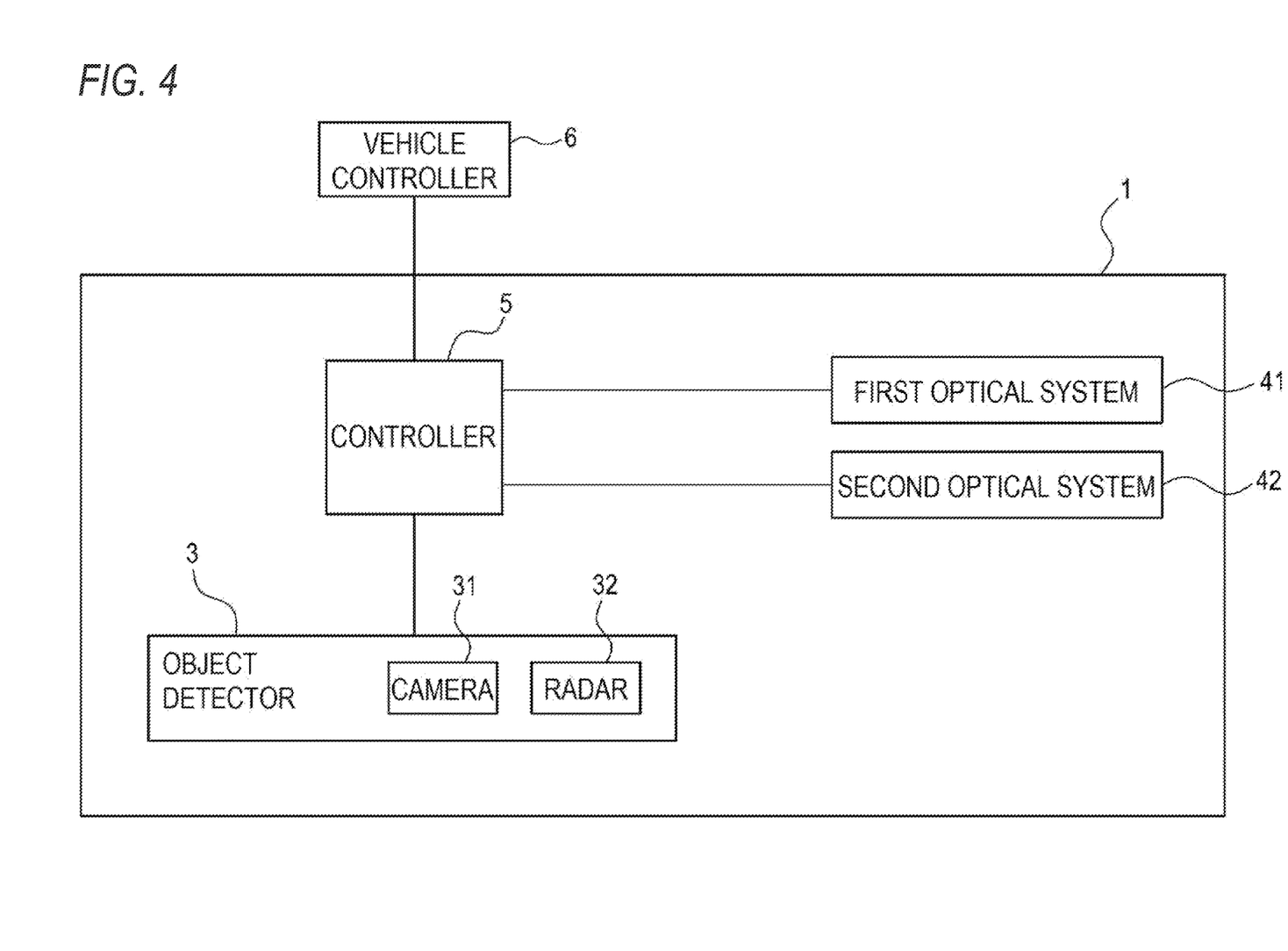
FIG. 4 is a functional block diagram of the vehicle including the vehicle lighting device according to the first embodiment.

FIG. 4 is a functional block diagram of the lighting device 1. As shown in FIG. 4, the object detector 3 includes: a camera 31; and a radar 32. The camera 31 includes, for example, an imager, such as a charge-coupled device (CCD) and a complementary metal-oxide-semiconductor (CMOS). The radar 32 is a millimeter-wave radar, a microwave radar, a laser radar, or the like. The camera 31 and/or the radar 32 is configured to acquire the interior environment information of the vehicle 10 to output the acquired interior environment information to the controller 5.

The controller 5 is configured to control the object detector 3, the first optical system 41, and the second optical system 42. The controller 5 is configured with an electronic control unit (ECU). The electronic control unit includes: a processor, such as a central processing unit (CPU); a read-only memory (ROM) in which a variety of control programs are stored; and a random-access memory (RAM) in which a variety of control data are temporarily stored. The processor is configured to load a specified program of the various control programs stored in the ROM onto the RAM to execute a variety of processing in cooperation with the RAM.

The controller 5 is electrically connected to the vehicle controller 6 and is configured to communicate with the vehicle controller 6. The vehicle controller 6 is configured to control the vehicle 10 in whole. The vehicle controller 6 is configured to receive a variety of information from a brake sensor, a speed sensor, a door-open/closed sensor, a human detection sensor, and the like in the vehicle 10. The vehicle controller 6 is configured to transmit a part of information received from various sensors to the controller 5.

In a memory of the controller 5, stored is origin information about the original state of the rear seat of the vehicle 10. The controller 5 is configured to determine, based on the origin information of the rear seat and the interior environment information transmitted from the object detector 3, whether a state of the rear seat of the vehicle 10 has changed or not.

Figure 5A:
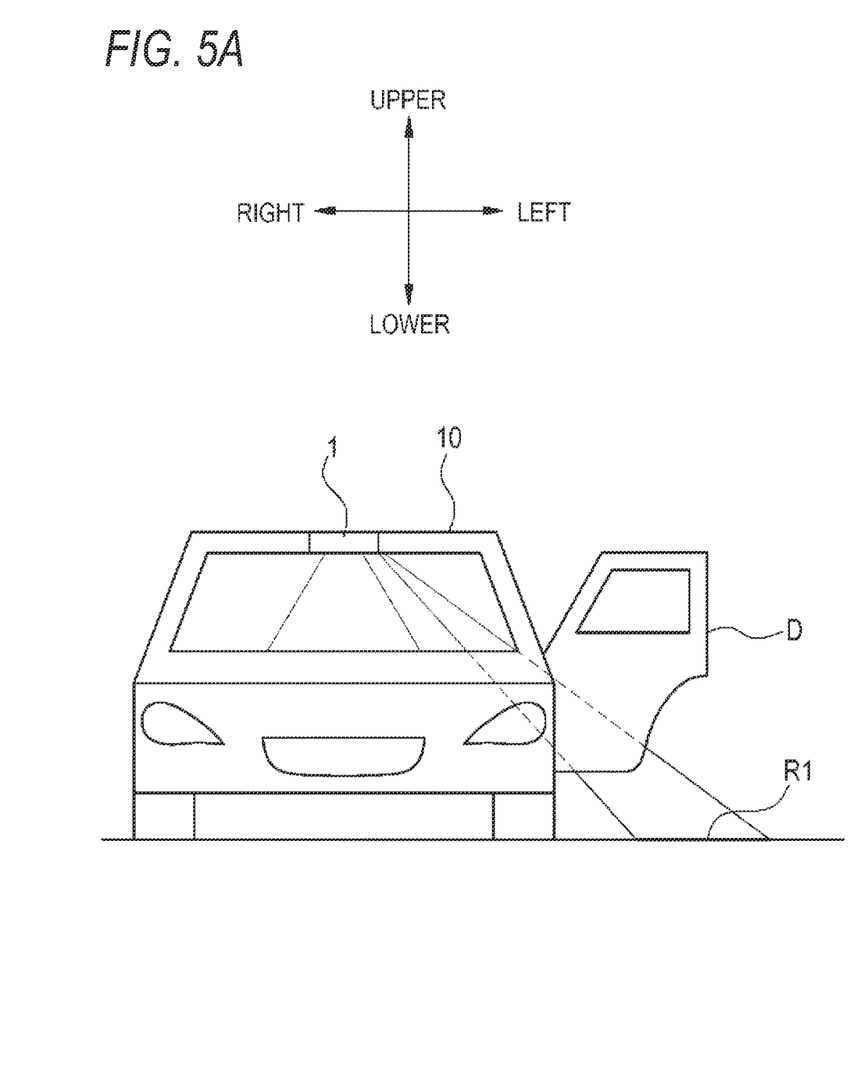
FIG. 5A is a diagram showing light emitted from the vehicle lighting device in the vehicle including the vehicle lighting device according to the first embodiment, as the interior of the vehicle is viewed from the front.
Figure 5B:
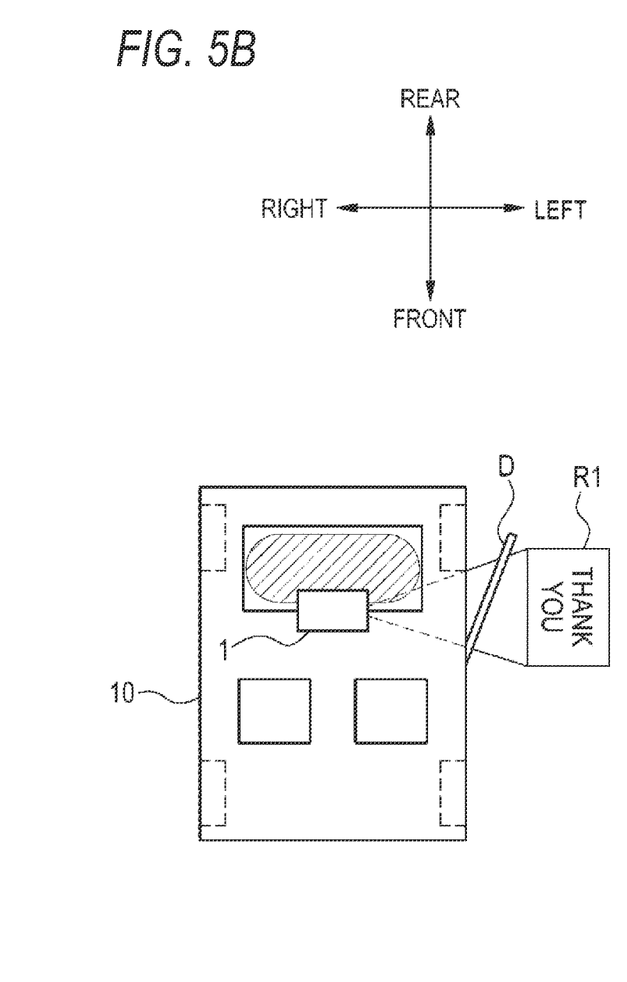
FIG. 5B is a diagram showing light emitted from the vehicle lighting device in the vehicle including the vehicle lighting device according to the first embodiment, as the interior of the vehicle is viewed from above.

Next, how the light is emitted from the lighting device 1 in the vehicle 10 will be described with reference to FIGS. 5A and 5B. FIG. 5A is a diagram showing the interior of the vehicle 10 as viewed from the front. FIG. 5B is a diagram showing the interior of the vehicle 10 as viewed from above.

For example, when the vehicle 10 arrives at a destination and stops, the vehicle controller 6 receives a stop signal indicating that the vehicle 10 stops from the speed sensor in the vehicle. The vehicle controller 6 is configured to transmit the received stop signal to the controller 5. When the door D on the left side of the vehicle 10 is opened after the vehicle 10 stops, the vehicle controller 6 receives an open signal indicating that the door D on the left side of the vehicle 10 is open from the door-open/closed sensor. The vehicle controller 6 is configured to transmit the received open signal to the controller 5.

The controller 5 is configured to control, based on the received stop signal, the first optical system 41 such that light is emitted from the first light source 412 to the interior R of the vehicle 10. In addition, the controller 5 is configured to control, based on the received open signal, the second optical system 42 such that light is emitted from the second light source 422 onto a getting-off position of the getting-off person who gets off from the door D on the outside (in a direction of the open door D on the left side of the vehicle 10) of the vehicle 10. Consequently, as exemplified in FIG. 5B, the first optical system 41 emits the diffused light to the rear seat of the vehicle 10, and the second optical system 42 emits the light to the outside of the vehicle 10 such that the light distribution pattern representing the predetermined information is displayed on a road surface (region R1) in the vicinity of the door D.

Since the light is emitted from the first light source 412 as the diffused light, the rear seat of the vehicle 10 is entirely illuminated by the first optical system 41.

The light emitted from the second light source 422 passes through the light-passing portion 423a of the second douser 423 and is emitted from the second lens 424 as the light distribution pattern representing the predetermined information. Consequently, as exemplified in FIG. 5B in the present embodiment, a message, such as "THANK YOU," offering hospitality to the getting-off person is displayed in the region R1 in the vicinity of the door D.

The second optical system 42 is configured to emit light onto the getting-off position of the getting-off person (for example, feet of the getting-off position) who gets off from the door D. That is, the second optical system 42 has a lighting function as a puddle light. Therefore, the second optical system 42 can display the predetermined information in the region R1 using the light emitted from the second optical system 42 while illuminating the region R1 in the vicinity of the door D. Thus, the predetermined information displayed in the region R1 is easily visually recognized by the getting-off person.

Since the first optical system 41 is configured to emit the diffused light to the interior R, the first lens 414 does not have a specific focal point. On the other hand, since the second optical system 42 is configured to emit the light such that the predetermined information is displayed a predetermined distance away from the lighting device 1, it is preferable for the second optical system 42 to have a predetermined focal length. Therefore, the focal length of the first lens 414 is different from that of the second lens 424. In the present embodiment, the rear focal point of the second lens 424 is in the vicinity of the second light source 422 or the second douser 423. Consequently, the lighting device 1 can illuminate the interior R of the vehicle 10 using the first optical system 41 and can display the predetermined information as a clear light image in the region R1 using the second optical system 42.

A case where a person getting off the vehicle 10 lefts something on the rear seat of the vehicle 10 will be described. When the getting-off person gets off the vehicle 10, the human detection sensor in the vehicle 10 detects that the getting-off person gets off the vehicle 10 and generates a getting-off signal to transmit the generated getting-off signal to the vehicle controller 6. The vehicle controller 6 is configured to transmit the acquired getting-off signal to the controller 5. When the controller 5 receives the getting-off signal from the vehicle controller 6, the controller 5 controls the object detector 3 to detect the interior environment information of the vehicle 10. The object detector 3 is configured to transmit the acquired interior environment information to the controller 5. The controller 5 is configured to determine, based on the received interior environment information and the origin information stored in the controller 5, whether or not the state of the rear seat has changed, or an object is on the rear seat. For example, if the information about the shape of the rear seat acquired by the object detector 3 is different from the origin information about the original state of the rear seat stored in the controller 5 beforehand, the controller 5 determines that something is left behind on the rear seat. When the controller 5 determines that something is left behind on the rear seat, the controller 5 controls the first optical system 41 such that the light emitted from the first optical system 41 flashes on and off to notify that the object (something left behind) is in the vehicle. Thus, the first optical system 41 flashes to notify that the object (something left behind) is in the vehicle. Consequently, the getting-off person of the vehicle 10 can notice that something is left behind. Since the object detector 3 includes at least the camera or the millimeter-wave radar, it is possible to detect whether or not the object is in the interior R of the vehicle 10 accurately.

Thus far, for example, for illumination of the interior R of the vehicle 10 (inside the vehicle) and road-surface drawing outside the vehicle 10 two lighting devices have been required, that is, a lighting device for emitting light to the interior of the vehicle and a lighting device for emitting light to the outside of the vehicle. In this case, the cost can be high since two vehicle lighting devices are required.

According to the lighting device 1 having the above configuration, since the first optical system 41 and the second optical system 42 are housed in the housing 2, the single lighting device can emit light for the illumination of the interior R of the vehicle 10 and for displaying the predetermined information to the outside of the vehicle 10. That is, the separate lighting devices for emitting light to the interior of the vehicle and for emitting light to the outside of the vehicle are not required. Thus, the lighting device 1 can contribute to the cost reduction. In addition, since the single lighting device, which is to be attached to the vehicle 10, is configured to emit light to the inside and outside of the vehicle, a load for attaching lighting devices to the vehicle 10 is reduced.

According to the lighting device 1 having the above configuration, since the first light source 412 of the first optical system 41 and the second light source 422 of the second optical system 42 are separate, light can be emitted only from one light source, for example, by controlling each light source according to circumstances. For example, if nothing is left behind in the vehicle, light may be emitted only from the second light source 422 of the second optical system 42.

According to the lighting device 1 having the above configuration, the focal length of the first lens 414 is different from that of the second lens 424. Therefore, it is possible to illuminate the interior R of the vehicle 10 (the inside of the vehicle) by the first optical system 41 and display the predetermined information to the outside of the vehicle 10 by the second optical system 42.

According to the lighting device 1 having the above configuration, since the second optical system 42 includes the second douser 423 including the light-passing portion 423*a* having a shape corresponding to the predetermined information, the second optical system 42 can display the predetermined information to the outside of the vehicle 10 with a simple configuration.

According to the lighting device 1 having the above configuration, since the second optical system 42 has the lighting function as the puddle light, it is possible to display the predetermined information to the outside of vehicle 10 while illuminating the outside of the vehicle 10. Therefore, the lighting device 1 can improve visibility of the information displayed outside the vehicle.

According to the lighting device 1 having the above configuration, the first optical system 41 is configured to flash to notify that the object is in the vehicle in a case where the object (for example, something left behind) is detected by the object detector 3. Therefore, if the getting-off person of the vehicle 10 lefts something in the interior R of the vehicle 10 (the inside of the vehicle), the lighting device 1 can notify the getting-off person that something is left in the vehicle. The getting-off person thereby can notice that something is left in the vehicle.

According to the lighting device 1 having the above configuration, since the object detector 3 includes at least the camera or the millimeter-wave radar, it is possible to detect whether or not there is an object in the interior R of the vehicle 10 (inside the vehicle) accurately.

Modification of Second Optical System

The second optical system 42 may include a light deflector instead of the second douser 423. The light deflector is configured with, for example, a digital micromirror device having mirrors (micromirrors), a microelectromechanical systems (MEMS) mirror, a movable mirror, such as a galvo mirror, and the like. In this case, the second optical system 42 is configured to control a direction of the light emitted from the second light source 422 for scanning to display the light pattern on the road surface.

Since the second optical system 42 according to the modification includes a digital micromirror device, the second optical system 42 can display the predetermined information to the outside of the vehicle 10 by scanning with the light emitted from the second light source 422.

Second Embodiment

Figure 6:
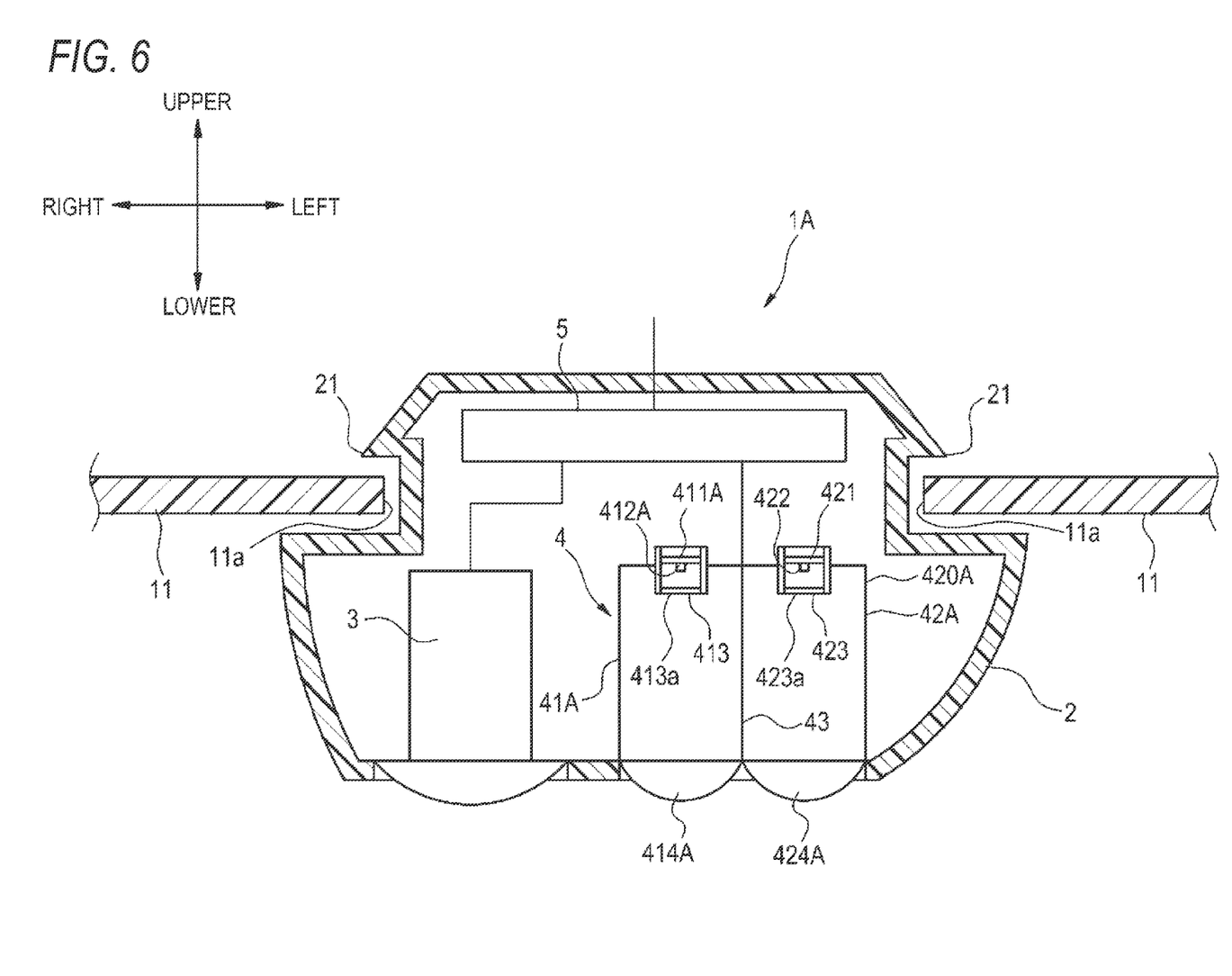
FIG. 6 is a cross sectional view of a vehicle lighting device according to a second embodiment.

Next, a lighting device 1A according to the second embodiment will be described with reference to FIG. 6. Description similar to that of the lighting device 1 according to the first embodiment will be omitted for the sake of convenience, as appropriate. The lighting device 1A is mounted on, for example, a vehicle having a boarding step, such as a bus. The lighting device 1A is different from the lighting device 1 according to the first embodiment in that an inner housing 420A (an example of a housing) configured to house a first optical system 41A and a second optical system 42A is provided instead of the inner housing 420. The lighting device 1A includes: the housing 2; the object detector 3; a lighting unit 4; and the controller 5. The lighting unit 4 includes: the first optical system 41A; the second optical system 42A; and the inner housing 420A.

The first optical system 41A includes: a first substrate 411A; a first light source 412A; a first douser 413; and a first lens 414A. The first substrate 411A has a tabular shape. The first light source 412A is on a lower surface of the first substrate 411A.

The first light source 412A is, for example, a semiconducting light-emitting device, such as an LED, a laser diode, and an organic/inorganic EL device.

The first douser 413 has a tabular shape. The first douser 413 is between the first light source 412A and the first lens 414A. The first douser 413 is, for example, a chart configured with a tabular member made of synthetic resin. The first douser 413 has a light-passing portion 413*a*. The light-passing portion 413*a* may be formed in a shape representing, for example, predetermined information. The shape representing the predetermined information is, for example, a shape corresponding to a character, a symbol, a figure, or the like that represents a message for a passenger getting on or off the vehicle.

The first lens 414A may be made of the material similar to that of the first lens 414. The first lens 414A is, for example, a convex lens, whose rear focal point is in the vicinity of the first light source 412A or the first douser 413. The light emitted from the first light source 412A passes through the light-passing portion 413*a* of the first douser 413 and is emitted from the first lens 414A as a light distribution pattern representing the predetermined information.

The second optical system 42A includes: the second substrate 421; the second light source 422; the second douser 423; and a second lens 424A. The second lens 424A is on a lower part of the second optical system 42A. The second lens 424A may be made of a material similar to that of the first lens 414. The second lens 424A is, for example, a convex lens, whose rear focus point is in the vicinity of the second light source 422 or the second douser 423. The light emitted from the second light source 422 passes through the light-passing portion 423*a* of the second douser 423 and is emitted from the second lens 424A as a light distribution pattern representing the predetermined information.

The inner housing 420A is configured to house the first optical system 41A and the second optical system 42A. The inner housing 420A has an opening facing downward to which the first lens 414A and the second lens 424A are attached.

The first optical system 41A is configured to emit light, for example, onto the boarding step inside the vehicle in the vicinity of a doorway of the vehicle. The second optical system 42A is configured to emit light, for example, onto the road surface outside the vehicle in the vicinity of the doorway of the vehicle. That is, the distance between the first optical system 41A and its target surface is different from that between the second optical system 42A and its target surface. According to the difference in distance, the focal length of the first lens 414A is different from that of the second lens 424A. Consequently, the predetermined information is displayed inside and outside the vehicle in the vicinity of the doorway of the vehicle as clear light images.

Between the first optical system 41A and the second optical system 42A is a partition 43. Therefore, in the inner housing 420A, the light emitted from the first light source 412A of the first optical system 41A and that emitted from the second light source 422 of the second optical system 42A do not cross each other.

The housing 2, the object detector 3, and the controller 5 may not be included in the light device 1A. That is, the lighting unit 4 may function as a lighting device. In this case, a controller similar to the controller 5 may be provided inside the inner housing 420A. In either case, since the lighting device 1A or the lighting unit 4 can emit light to the inside and outside of the vehicle without using a lighting device for emitting light to the inside of the vehicle and a lighting device for emitting light to the outside of the vehicle separately, the lighting device 1A or the lighting unit 4 can contribute to the cost reduction. In addition, since the single lighting device, which is to be attached to the vehicle, is configured to emit light to the inside and outside of the vehicle, the load for attaching lighting devices to the vehicle is reduced.

In the second embodiment, the predetermined information displayed by the first optical system 41A is, for example, a message (for example, "Don't Stop") indicating that a stop in the vicinity of the doorway is prohibited, oblique lines, an arrow indicating a traveling direction of the passenger getting on or off, or the like. The predetermined information displayed by the second optical system 42A is, for example, a message (for example, "Welcome" or "Goodbye") for prompting the passenger to get on or off, an arrow indicating a traveling direction of the passenger getting on or off, or the like.

Third Embodiment

Figure 7:
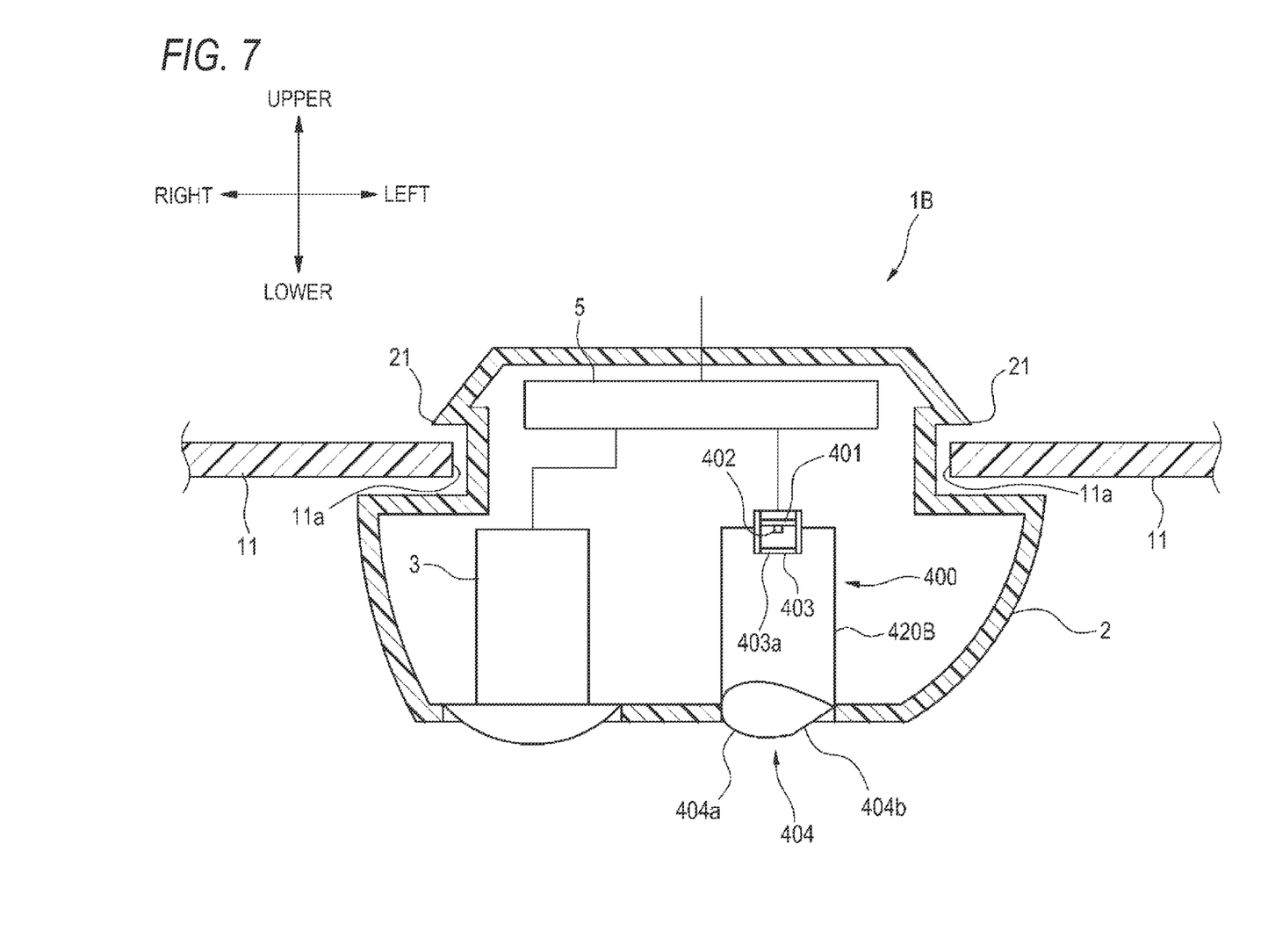
FIG. 7 is a cross sectional view of a vehicle lighting device according to a third embodiment.

Next, a lighting device 1B according to the third embodiment will be described with reference to FIG. 7. Description similar to that of the lighting device 1 according to the first embodiment or the lighting device 1A according to the second embodiment will be omitted for the sake of convenience, as appropriate. The lighting device 1B is different from the lighting device 1A according to the second embodiment in that the lighting device 1B includes a lighting unit 400 instead of the lighting unit 4. The lighting unit 400 is configured to have the function of the first optical system 41A and that of the second optical system 42A in the second embodiment. In the lighting unit 400, each of the light sources, the dousers, and the lenses are unified.

The lighting unit 400 includes: an inner housing 420B; a substrate 401; a light source 402; a douser 403; and a lens 404, each of which is shared with the first optical system and the second optical system. The inner housing 420B is configured to house the substrate 401, the light source 402, and the douser 403. The inner housing 420B has an opening facing downward to which the lens 404 is attached.

The substrate 401 has a tabular shape. The light source 402 is on a lower surface of the substrate 401.

The light source 402 is, for example, a semiconducting light-emitting device, such as an LED, a laser diode, and an organic/inorganic EL device. Light emitted from the light source 402 enters the lens 404 via the douser 403.

The douser 403 has a tabular shape. The light shielding plate 403 is between the light source 402 and the lens 404. The douser 403 is, for example, a chart configured with a tabular member made of synthetic resin. The douser 403 has a light-passing portion 403a including: a region for passing light emitted to the inside of the vehicle; and another region for passing light emitted to the outside of the vehicle. Each region of the light-passing portion 403a may be formed in a shape representing, for example, predetermined information. The shape representing the predetermined information is similar to that in the second embodiment. The lighting unit 400 may include a light deflector instead of the douser 403. The light deflector is configured with, for example, a digital micromirror device having mirrors (micromirrors), a MEMS mirror, a movable mirror, such as a galvo mirror, and the like. In this case, the lighting unit 400 is configured to control a direction of the light emitted from the light source 402.

The lens 404 may be formed of the material similar to that of the first lens 414. The lens 404 is, for example, a convex lens. The lens 404 includes: a first portion 404a; and a second portion 404b. The first portion 404a is on the inner side (right side in FIG. 7) of the vehicle with respect to the second portion 404b. The lens 404 is configured such that the focal length of the first portion 404a is shorter than that of the second portion 404b. The first portion 404a of the lens 404 is configured to have the function similar to that of the first lens 414A according to the second embodiment, and the second portion 404b of the lens 404 is configured to have the function similar to that of the second lens 424A.

According to the lighting device 1B or the lighting unit 400 having the above configuration, the lens 404 includes: the first portion 404a configured to function similarly to the first lens 414A; and the second portion 404b configured to function similarly to the second lens 424A according to the second embodiment. Therefore, since the lighting device 1B or the lighting unit 400, which includes only the single lens 404, can emit light to the inside and outside of the vehicle, the number of components of the lens is reduced.

According to the lighting device 1B or the lighting unit 400 having the above configuration, since the lighting device 1B or the lighting unit 400 can emit light to the inside and outside of the vehicle with one light source, a plurality of light sources is not required, thereby reducing the cost further.

Method for Controlling First Optical System and Second Optical System

Figure 8:
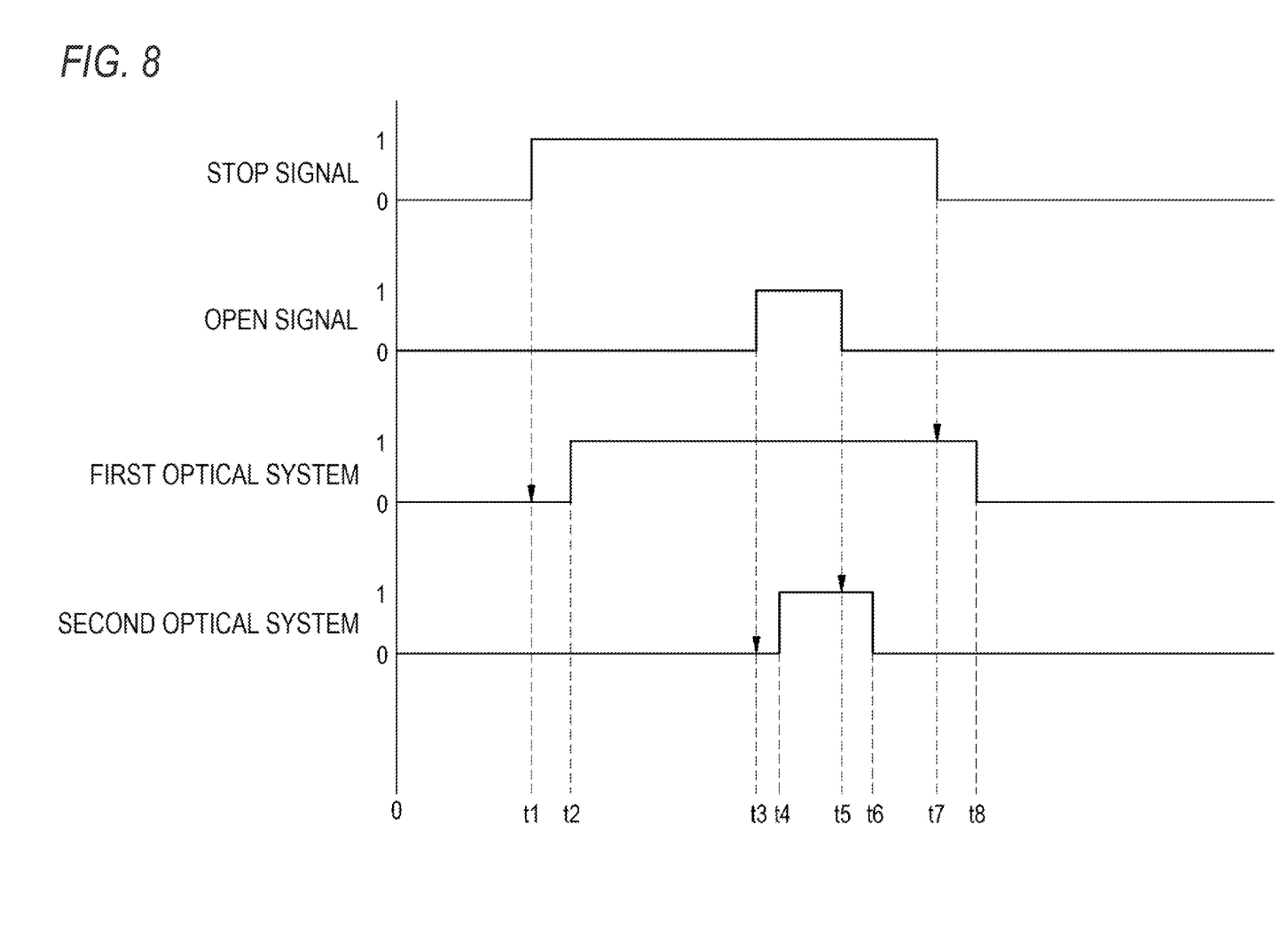
FIG. 8 is a timing diagram showing signal processing performed by a vehicle controller in the vehicle and a controller in the vehicle lighting device.

Next, a method for controlling the first optical system 41 and the second optical system 42 will be described with reference to FIG. 8. FIG. 8 is a diagram showing signal processing performed by the vehicle controller 6 and the controller 5. In the following example, the vehicle 10 turns stopped and travels again after a certain period of time. When the vehicle 10 turns stopped, the vehicle controller 6 receives a stop signal indicating that the vehicle 10 stops from the speed sensor in the vehicle at t1 to transmit the stop signal to the controller 5. The controller 5 receives the stop signal at t1.

When the controller 5 receives the stop signal from the vehicle controller 6, the controller 5 starts controlling the first optical system 41 based on the stop signal such that light is emitted from the first light source 412 at time t2.

When the door D of the vehicle 10 is opened, the vehicle controller 6 receives an open signal indicating that the door D of the vehicle 10 opens from the door-open/closed sensor to transmit the open signal to the controller 5 at time t3. The controller 5 receives the open signal at time t3.

When the controller 5 receives the open signal from the vehicle controller 6, the controller 5 starts controlling the second optical system 42 based on the open signal such that light is emitted from the second light source 422 at time t4.

When the door D of the vehicle 10 is closed, the open signal turns untransmitted from the door-open/closed sensor to the vehicle controller 6. Therefore, at time t5, reception of the open signal by the vehicle controller 6 and transmission of that to the controller 5 end.

At time t6, the controller 5 stops the control of the second optical system 42 in response to the open signal untransmitted from the vehicle controller 6. Therefore, the controller 5 controls the second optical system 42 such that light is emitted from the second light source 422 from time t4 until time t6. That is, the predetermined information is displayed on the region R1 from time t4 until time 6.

When the vehicle 10 starts traveling, the stop signal turns untransmitted from the speed sensor to the vehicle controller 6. Therefore, at time t7, reception of the stop signal by the vehicle controller 6 and transmission of that to the controller 5 end.

At time t8, the controller 5 stops the control of the first optical system 41 in response to the stop signal untransmitted from the vehicle controller 6. Therefore, the controller 5 controls the first optical system 41 such that light is emitted from the first light source 412 from time t2 until time t8. That is, from time t2 until time t8, the interior R of the vehicle 10 is continuously illuminated by the first optical system 41.

For example, if the vehicle 10 is a taxi, the first optical system 41 starts emitting light to the interior R at time t2. Therefore, at time t2, a passenger of the vehicle 10 recognizes that the vehicle 10 has arrived at the destination. At time t4, which is later than the door D of the vehicle 10 is opened, the second optical system 42 starts emitting light onto the region R1. That is, display of the predetermined information on the region R1 is started at time t4. Therefore, the lighting device 1 can display, for example, a message offering hospitality or the like as shown in FIG. 5B to a passenger getting off the vehicle 10.

According to the above configuration, the controller 5 is configured to control the first optical system 41 and the second optical system 42 such that light is emitted simultaneously from the first light source 412 and the second light source 422 at a certain period of time. That is, the controller 5 controls the first optical system 41 and the second optical system 42 such that light is emitted simultaneously from the first light source 412 and the second light source 422 from time t4 until time t6. Consequently, from time t4 until time t6, the interior of the vehicle is illuminated by the first optical system 41, and the predetermined information is displayed outside the vehicle by the second optical system 42.

The method for controlling the first optical system 41 and the second optical system 42 may be applied to the lighting device 1A or 1B. In this case, the controller 5 of in the lighting device 1A can control the first optical system 41 and the second optical system 42 such that light is emitted simultaneously from the first light source 412 and the second light source 422 at a certain period of time. If the lighting unit 400 includes the light deflector instead of the douser 403, the controller 5 of the lighting device 1B can perform control such that light emitted from the light source 402 is emitted selectively from both the first portion 404a and the second portion 404b of the lens 404 or one of those. Therefore, in this case, the controller 5 can control the lighting unit 400 such that light emitted from the light source 402 is emitted simultaneously from the first portion 404a and the second portion 404b of the lens 404 at a certain period of time.

The present disclosure is not limited to the embodiments described above and may be modified or improved, as appropriate. Materials, shapes, dimensions, values, forms, numbers, places, and the like of the components in the embodiments described above can be arbitrary or not limited thereto as long as an object of the present disclosure can be achieved.

Although the light from the first optical system 41 is emitted as the diffused light in the first embodiment, the present disclosure is not limited thereto. For example, the first lens 414 may be a convex lens, and the first optical system 41 may include: an optical element configured to change a light-emission direction; a variable filter configured to change a light-passing region; or the like. In this case, when an object (such as something left behind) is on the rear seat, the lighting device 1 can perform control such that the first optical system 41 emits light to the object.

Although the first lens 414A and the second lens 424A are separate in the second embodiment, those may be formed as an integrated lens.

Although the lighting unit 4 includes the partition 43 in the second embodiment, the lighting unit 4 may not include the partition 43.

In the second embodiment and the third embodiment, the region inside the vehicle on which the predetermined information is displayed is not limited to the vicinity of the doorway of the vehicle and may be a window of the vehicle or the like. In this case, it is preferable for the window to have a dimming film configured to adjust transmissivity. When the predetermined information is displayed on the window, by performing control to reduce the transmissivity of the window, the window can be caused to function as a screen for displaying the predetermined information.

Although the controller 5 controls the first optical system 41 such that light is emitted from the first light source 412 from time t2 until time t8 and controls the second optical system 42 such that light is emitted from the second light source 422 from time t4 until time t6 in the method for controlling the first optical system and the second optical system described above, the present disclosure is not limited to this example. For example, if the vehicle 10 is a bus, the controller 5 may control the first optical system 41 such that light is emitted from the first light source 412 from time t4 until time t6 and may control the second optical system 42 from a predetermined time later from time t4 until time t6. In this case, the controller 5 can control the second optical system 42 such that the second light source 422 of the second optical system 42 starts emitting light when the door D of the vehicle 10 is completely opened and the passenger of the vehicle 10 starts to get off. Therefore, the light emitted from the second light source 422 can be efficiently used, which contributes to saving energy.

Although the vehicle controller 6 continuously transmits the stop signal to the controller 5 while receiving the stop signal from the speed sensor in the method for controlling the first optical system and the second optical system described above, the present disclosure is not limited to this example. For example, the vehicle controller 6 may transmit a signal indicating the beginning of reception of the stop signal from the speed sensor to the controller 5 in response to the beginning of the reception of the stop signal from the speed sensor and may transmit a signal indicating the end of the reception of the stop signal from the speed sensor to the controller 5 in response to the end of the reception of the stop signal from the speed sensor.

Although the vehicle controller 6 continuously transmits the open signal to the controller 5 while receiving the open signal from the door-open/closed sensor in the method for controlling the first optical system and the second optical system described above, the present disclosure is not limited to this example. For example, the vehicle controller 6 may transmit a signal indicating that the beginning of reception of the open signal from the door-open/closed sensor to the controller 5 in response to the beginning of the reception of the open signal from the door-open/closed sensor and may transmit a signal indicating the end of the reception of the open signal from the door-open/closed sensor to the controller 5 in response to the end of the reception of the open signal from the door-open/closed sensor.

The invention claimed is:

1. A vehicle lighting device comprising:
   a first optical system including a light source and a first lens;
   a second optical system including a light source and a second lens;
   an object detector configured to detect presence or absence of an object inside a vehicle; and
   a housing configured to house the first optical system, the second optical system, and the object detector, wherein
   the first optical system is configured to illuminate an interior of a vehicle,
   the second optical system is configured to display predetermined information to the outside of the vehicle, and
   the first optical system is configured to light up to notify the presence of the object in a case where the object is detected by the object detector.

2. The vehicle lighting device according to claim 1, wherein
   the first lens and the second lens are integrally formed.

3. The vehicle lighting device according to claim 1, wherein
   the light source of the first optical system and the light source of the second optical system are configured with a single light source.

4. The vehicle lighting device according to claim 1, wherein
   the light source of the first optical system and the light source of the second optical system are configured with separate light sources.

5. The vehicle lighting device according to claim 1, wherein
   a focal length of the first lens is different from a focal length of the second lens.

6. The vehicle lighting device according to claim 1, wherein
   the second optical system includes a digital micromirror device.

7. The vehicle lighting device according to claim 1, wherein
   the second optical system includes a douser that has a light-passing portion having a shape corresponding to the predetermined information.

8. The vehicle lighting device according to claim 1, wherein
   the second optical system is configured to function as a puddle light.

9. The vehicle lighting device according to claim 1, wherein
   the object detector includes at least a camera or a millimeter-wave radar.

10. The vehicle lighting device according to claim 1, further comprising:
    a controller configured to control the first optical system and the second optical system, wherein
    the controller controls the first optical system and the second optical system such that light is emitted simultaneously from the light source of the first optical system and the light source of the second optical system at a certain period of time.

* * * * *